United States Patent Office 3,064,699
Patented Nov. 20, 1962

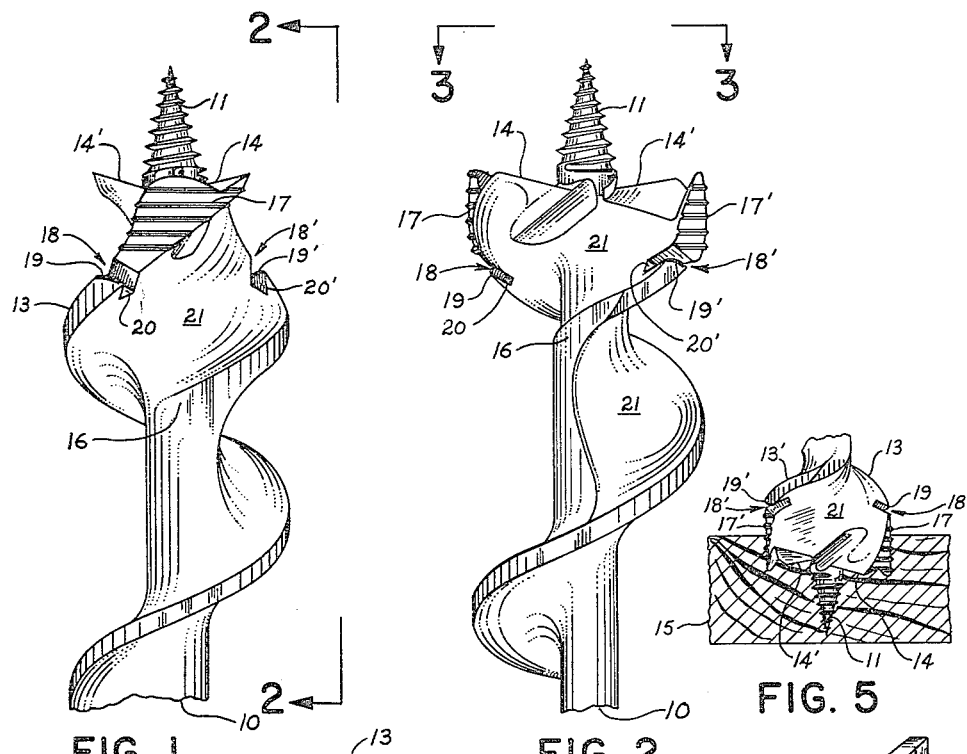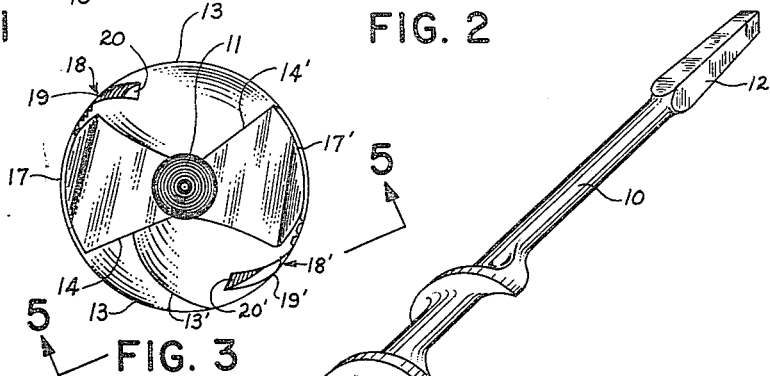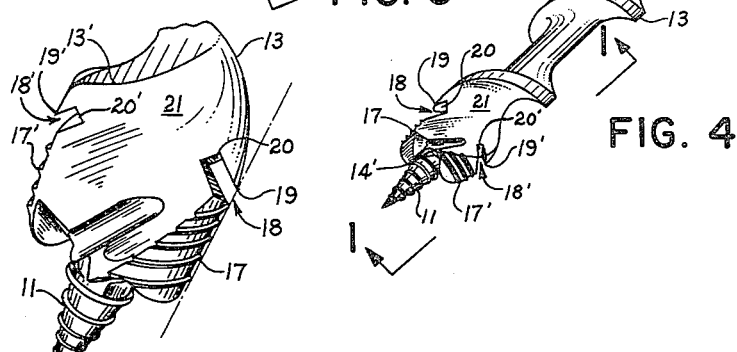

3,064,699
SELF-ADVANCING AUGER BIT WITH SUPPLE-
MENTARY LEAD SCREW MEANS
Jay L. Gleason, Oxnard, Calif., assignor of one-tenth to
Gadget-Of-The-Month Club, Inc., North Hollywood,
Calif., a corporation of California
Filed Feb. 7, 1961, Ser. No. 87,649
1 Claim. (Cl. 145—117)

The present invention consists of an improved auger bit which provides a supplementary lead screw means in addition to the conventional lead screw means whereby to make the bit an extremely effective type of self-progressing bit which will be very positively pulled into the object which is to be drilled with a great deal more effectiveness by reason of the supplementary lead screw means of the present invention than would be true of a conventional auger bit.

The supplementary lead screw means comprises a pair of oppositely disposed and oppositely inclined sharpened cutting and penetrating edges adapted to cut into and penetrate an object being drilled, with flute rib means immediately back of said cutting and penetrating edges being circumferentially provided with exterior threaded portions which, in one preferred form of the invention, have an effective diameter slightly less than the diameter of the hole which is to be drilled although not specifically so limited.

Then, in order to provide a clean-cut and non-threaded hole upon completion of the drilling operation, the improved auger bit of the present invention includes thread-removing and debris-clearance means comprising notch-defining portions in the flute rib means immediately back of each of the supplementary lead screw means comprising the threaded portions thereof and provided immediately therebehind with larger diameter projecting thread-cutting edge means or edges comprising, in one preferred form, a forwardly projecting sharpened edge at the rear of each notch means adapted to remove from the object being drilled the threads formed by the threaded portions of the flute rib means positioned in front of said thread-cutting edge means or edges.

In other words, the invention consists essentially of providing much more effective and positive lead screw means than the conventional lead screw. This will cause the auger bit to be pulled into the work with more facility by reason of this modification, which consists of threading the first one quarter of an inch or so of the conventional cutting head and providing a thread-removing cutter behind that for cutting and clearing the threads cut into the wood by the threaded portion of the bit. In other words, the first portion of the bit cuts a hole which is slightly smaller than the intended hole and threads itself into this reduced-sized hole after which it cuts and clears the threads out, with the following thread-removing cutter carried by the flute ribs. Thus, the bit will provide a conventional clean-cut hole.

Each of the notch means positioned in front of the thread-cutting edge means effectively comprises debris-clearance means adapted to facilitate the removal of particles of wood and to feed them into the helical trough positioned between the helically positioned flute rib means symmetrically disposed around the longitudinal auger shaft.

It is an object of the present invention to provide an improved self-progressing auger bit having effectively improved and more positive-action lead screw means of the character referred to above and including novel thread-removing and debris-clearance means of the character referred to above, and of a construction such as to minimize the dulling thereof and to facilitate the easy sharpening thereof when required.

It is a further object to provide an improved self-progressing auger bit of the character referred to above which is of extremely simple, cheap, foolproof construction such as to be conducive to widespread use thereof.

Further objects are implicit in the detailed description which follows hereinafter and will be apparent to persons skilled in the art after a careful study thereof.

For the purpose of clarifying the nature of the present invention, one exemplary embodiment is illustrated in the hereinbelow-described figures of the accompanying single drawing sheet and is described in detail hereinafter.

FIG. 1 is an enlarged, fragmentary, elevational view of a portion of the forward end of one exemplary embodiment of the present invention taken in the direction of the arrows 1—1 of FIG. 4.

FIG. 2 is a side elevational view of FIG. 1 taken in the direction of the arrows 2—2 of FIG. 1.

FIG. 3 is an end view taken in the direction of the arrows 3—3 of FIG. 2.

FIG. 4 is a smaller-scale perspective view of the complete novel auger bit of the present invention illustrated fragmentarily in FIGS. 1–3.

FIG. 5 is a fragmentary view taken in the direction of the arrows 5—5 of FIG. 3 and shows the novel auger bit of the present invention in operative relationship with respect to an object to be drilled. This view also clearly shows that the thread-cutting edges have a slightly greater diameter than the exterior threaded portions comprising the supplementary lead screw means, whereby to cut out all threads from the hole so that the hole produced by the device will be clean cut clear through.

FIG. 6 is an enlarged fragmentary view of the right portion of FIG. 5.

Referring to the figures for exemplary purposes, one illustrative embodiment of the invention takes a typical exemplary form wherein it comprises a longitudinal auger shaft 10, preferably, although not necessarily, of substantially cylindrical cross-sectional configuration having a co-axial, centered, tapered, threaded, conventional lead screw 11 defining a penetrating end thereof and having at the opposite end thereof a conventional chuck-engageable or collet-engageable means 12 which is adapted to be received within any type of chuck or collet of either a hand-driven or power-driven drill, brace, or the like, not shown, since such is well-known in the art and comprises no part of the present invention.

The longitudinal auger shaft 10, along a substantial portion of the length thereof, is exteriorly integrally provided with helically positioned flute rib means 13 symmetrically disposed around the longitudinal auger shaft 10 and terminating at one end in an inclined, sharpened, cutting, and penetrating edge 14 adapted to cut into and penetrate an object being drilled, such as the piece of wood indicated at 15 in FIG. 5. It should be noted that there is a similar but oppositely disposed and oppositely inclined, sharpened cutting and penetrating edge 14' positioned on the other side of the central axis of the centered tip lead screw 11 and the longitudinal auger shaft 10 and carried by a short or abbreviated flute rib means 13' which terminates at the location indicated at 16 a short distance back of the end of the auger bit. These two oppositely disposed and oppositely inclined, sharpened, cutting and penetrating edges 14 and 14' effectively comprise a cutting head slightly lesser in diameter than the hole which is to be drilled and the outer circumferential exterior of each of the flute rib means 13 and 13' immediately behind the sharpened cutting and penetrating edges 14 and 14' are provided with supplementary lead screw means comprising the exterior threaded portions 17 and 17' which, as pointed out above, are of slightly lesser diameter than the hole which is to be drilled in the object 15. This provides a very positive self-progressing lead screw action positively pulling the entire auger bit into the object 15 which is to be drilled in a manner which makes it virtually impossible to strip the threads formed in the object 15, which frequently happens with conventional prior art auger bits employing only a centered tapered lead screw of the type indicated at 11.

The invention also includes thread-removing and debris-clearance means, indicated generally at 18, and at 18' and carried respectively by the main flute rib 13 and the abbreviated or short oppositely disposed flute rib 13' for the purpose of completely removing threads formed in the object 15 being drilled by the threaded portions 17 and 17'. This is accomplished by the thread-cutting edges 19 and 19' angularly cut into each of the flute ribs 13 and 13' at the back of the two debris-clearance notches 20 and 20'. It should be clearly noted that the cutting edges 19 and 19' extend to the full diameter of the hole which is to be drilled and thus effectively cut and remove threads formed in the object 15 by the slightly smaller diameter exterior threaded portions 17 and 17'. It should further be noted that the debris produced in this operation is fed through the notches 20 and 20' into the trough region 21 which extends helically along the length of the auger shaft between the helical flute rib means, thus providing a very effective debris cleaning and feeding action.

Furthermore, it should be noted that the sharpened thread-cutting and thread-removing edges 19 and 19' are so positioned as to be effectively protected when the tool is not in use. In other words, said edges are not likely to strike any other objects and become dulled. This is a great advantage of prior art constructions.

It should further be noted that the thread-cutting and thread-removing edges 19 and 19' are so arranged as to be very easily sharpened by merely grinding or filing same. This is a great advantage over prior art constructions.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

An auger bit with improved lead screw, comprising a longitudinal auger shaft of substantially cylindrical cross-sectional configuration having a tapered threaded lead screw defining a penetrating end thereof, said shaft being exteriorly integrally provided with helically positioned flute rib means symmetrically disposed therearound and terminating at one end in oppositely disposed and oppositely inclined sharpened cutting and penetrating edges adapted to cut into and penetrate an object which is to be drilled, the flute rib means adjacent each of the cutting and penetrating edges thereof being circumferentially provided with exterior threaded portions of slightly lesser diameter than the hole which is to be drilled; and thread-removing and debris-clearance means carried by the flute rib means immediately back of each of the exterior threaded portions of said flute rib means for removing the threads formed in a drilled object by said exterior threaded portions of said flute rib means positioned in front of said thread-removing and debris-clearance means, said thread-removing and debris-clearance means comprising a pair of oppositely positioned notch means in oppositely positioned portions of said flute rib means immediately back of corresponding parts of said exterior threaded portions, with each of said notch means extending substantially across and through the corresponding portion of said flute rib means and downwardly thereinto from the outer helical edge thereof in a depth direction having a component directionally similar to the helical edge of the adjacent portion of said flute rib means, the forward edge of each of said notch means being defined by a rear part of the corresponding one of said exterior threaded portions and the rear part of each of said notch means being provided with and defined by a helically forwardly directed thread-cutting edge comprising a cantilever outer edge projection of the corresponding part of the corresponding one of said flute rib means which is of a slightly greater diameter than the exterior threaded portion defining the forward edge of said notch means, thus defining therebetween a through slot adapted to receive file means for the purpose of sharpening said helically forwardly projecting thread-cutting edge at the rear thereof, said helically forwardly projecting sharpened thread-cutting edges at the rear of said notch means being adapted to remove threads formed in a drilled object by the slightly smaller diameter exterior threaded portions positioned forwardly thereof, and said through-slotted notch means being adapted to facilitate the helical rearward feeding of debris produced by the drilling operation along the auger shaft between adjacent projecting helical flute rib means.

References Cited in the file of this patent

UNITED STATES PATENTS

| | | |
|---|---|---|
| 287,538 | Hall | Oct. 30, 1883 |
| 1,557,900 | Thompson | Oct. 20, 1925 |